Figure 1:
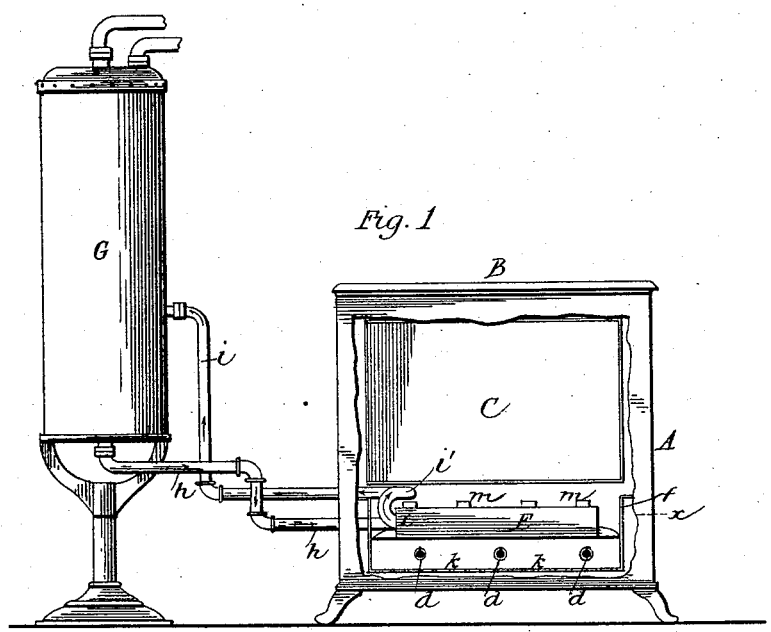

(No Model.) 3 Sheets—Sheet 1.

W. C. BUCKLIN.
COMBINED STOVE AND WATER BACK.

No. 455,528. Patented July 7, 1891.

Witnesses
Will S. Norton
W. A. Roberts

Inventor
William C. Bucklin
By his Attorney
E. H. Clark (No Model.) 3 Sheets—Sheet 2.
W. C. BUCKLIN.
COMBINED STOVE AND WATER BACK.
No. 455,528. Patented July 7, 1891.
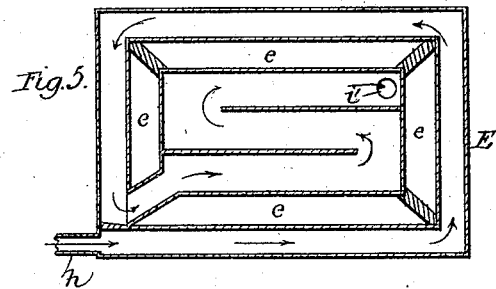
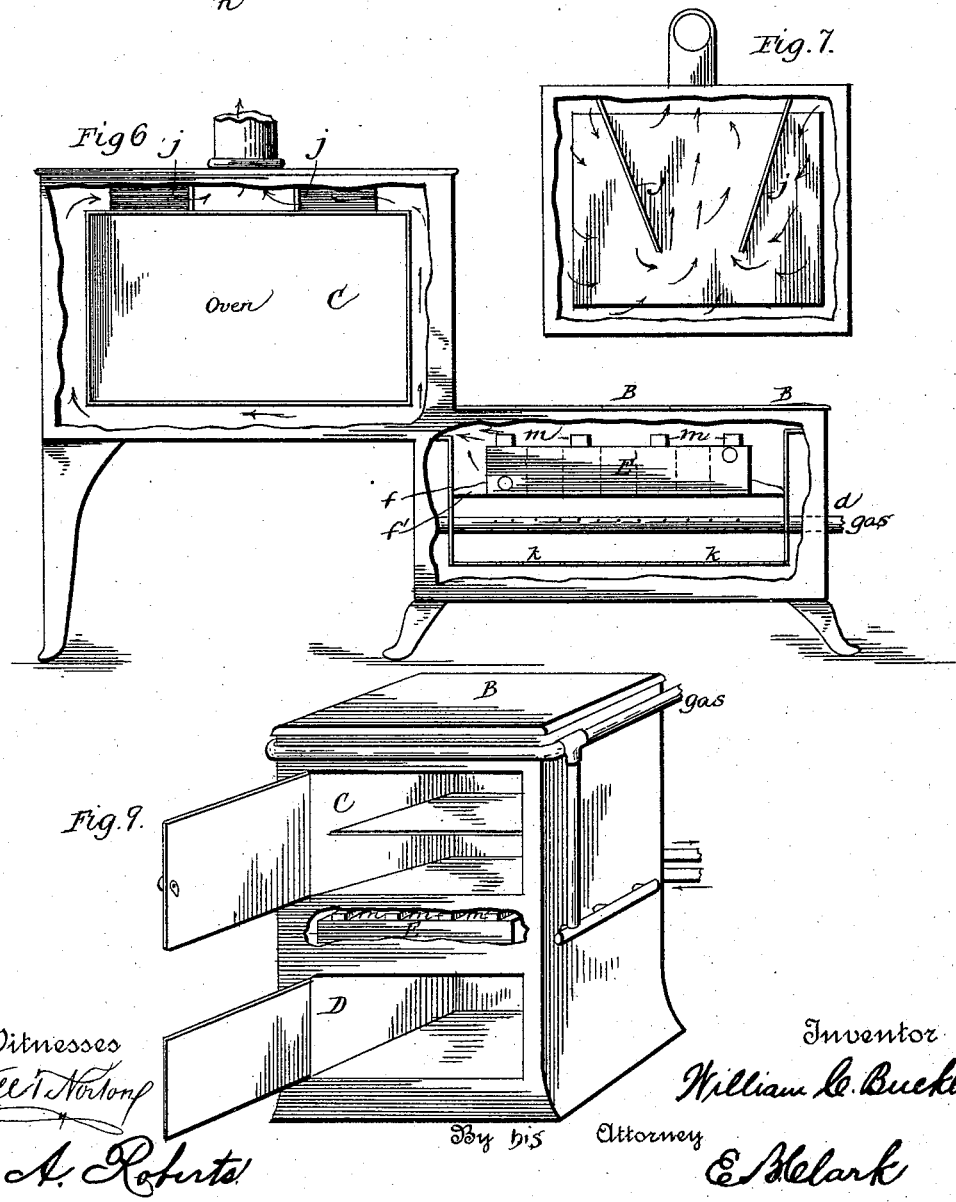

(No Model.) 3 Sheets—Sheet 3.

W. C. BUCKLIN.
COMBINED STOVE AND WATER BACK.

No. 455,528. Patented July 7, 1891.

Witnesses
Will T. Norton
H. A. Roberts

Inventor
William C. Bucklin
By his Attorney
E. B. Clark

UNITED STATES PATENT OFFICE.

WILLIAM COMSTOCK BUCKLIN, OF NEW YORK, N. Y.

COMBINED STOVE AND WATER-BACK.

SPECIFICATION forming part of Letters Patent No. 455,528, dated July 7, 1891.

Application filed March 26, 1889. Serial No. 304,777. (No model.)

*To all whom it may concern:*

Be it known that I, WILLIAM COMSTOCK BUCKLIN, a citizen of the United States, residing at New York city, in the county of New York and State of New York, have invented certain new and useful Improvements in a Combined Stove and Water-Back; and I do hereby declare the following to be a full, clear, and exact description of the invention, such as will enable others skilled in the art to which it appertains to make and use the same.

This invention relates to certain improvements in gas-stoves such as are used for cooking and heating purposes, and more particularly to a device for heating and circulating water, suitably placed with relation to the burners, within the stove, and is termed a "water-back;" also, to a frame which serves as a carrier or holder for the water-back and the burners placed under it; also, to the arrangement or location of the water-back in connection with baking-oven or in connection with a baking and a broiling oven.

The object of my invention is to provide effective and economical means for heating water in connection with a circulating-boiler in a gas, oil, or other fluid burning stove; also, to provide a casing or frame which acts as a carrier or holder for the water-back and the burners placed under such water-back. The water-back or hot-water generator when placed under the oven protects the bottom of the same and divides and deflects the heated products around the oven, thereby acting as a guard, so that its bottom will not become too hot, also distributing the heat equally, so that a uniform temperature is obtained at top and bottom of the oven. When the water-back and burners are placed in the center of the stove, with baking-oven over them and the roasting and broiling oven under them, the same burner or burners will supply the necessary heat for broiling and roasting by deflecting and reflecting, and the hot products of combustion passing through and around the spaces of the water-back to the oven above will keep both ovens hot. The supporting frame or casing confines the heat around the water-back and acts as a flue for drawing in the necessary air for combustion and directing the heated products, whereby the stove can be heated up much more quickly and the capacity of the water-back be much increased.

My invention is illustrated in the accompanying drawings, in which—

Figure 2:
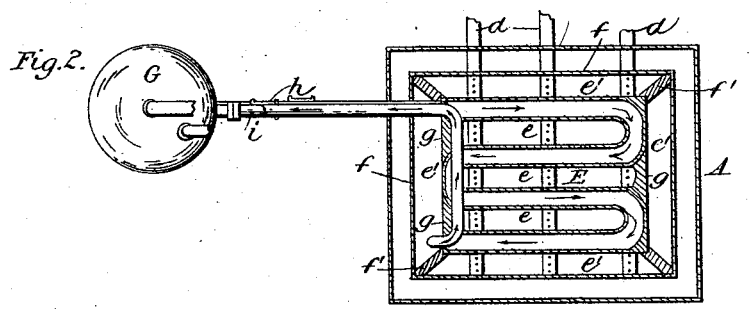
Figure 3:
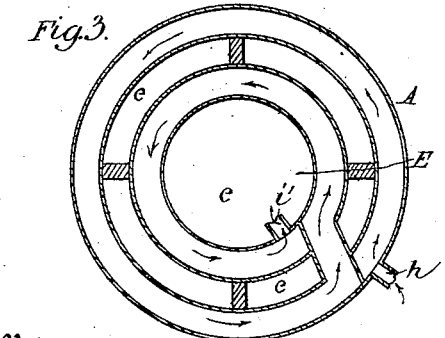
Figure 4:
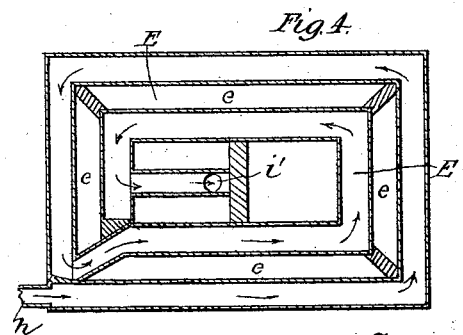
Figure 8:
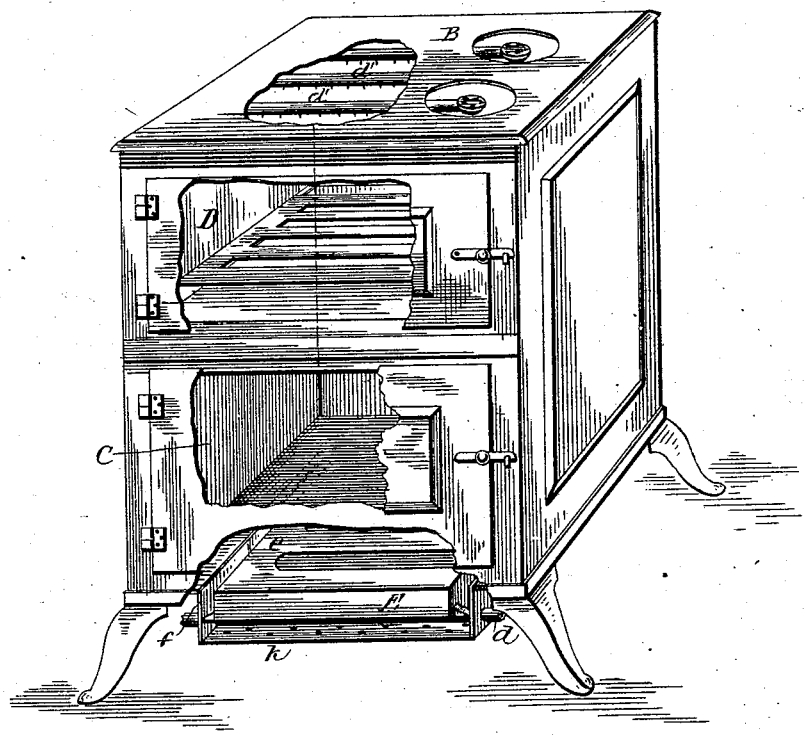

Figure 1 illustrates in elevation one form of stove in connection with a circulating-boiler, with the front of the stove partly broken away to show its interior arrangement. Fig. 2 represents a horizontal section taken through the line $x\ x$ of Fig. 1, the pipes and boiler, however, being shown in full. Figs. 3, 4, and 5 represent in horizontal section slight modifications of the water-back. Fig. 6 represents a side elevation of stove with the oven placed at one side, parts of the stove being broken away. Fig. 7 represents a top view of oven, showing the deflecting plates or flanges. Fig. 8 represents a perspective view of a stove, portions thereof being broken away. Fig. 9 represents a similar view also of another form of stove under my invention.

The same letters of reference indicate like parts in all the figures.

I will first describe my invention with relation to Figs. 1 and 2. A indicates the stove proper, which is provided with a top B for cooking utensils and with a compartment C, serving as an oven and situated over the heating devices consisting of the burners $d\ d$ and the hot-water generator or "water-back" (as I prefer to call it) E. This water-back is a casting provided with water-passages made in the form of a coil to allow the greatest amount of water possible to be exposed to the burners, and is supported in a cast or sheet iron frame $f$ by means of lugs $f'$. It will be noted that the frame $f$ forms a trough which completely incloses the burners and water-back on all sides, which is separated from the walls of the stove proper on all sides by a surrounding air-space. By this means I prevent in a great measure the radiation of the heat from the sides of the stove and confine it within the trough, concentrating it upon the water-back and oven. I am thereby enabled to avoid much waste of heat.

The water-back is provided at the ends of the fire-spaces $e$ with connecting bridges $g$ for strengthening it, and act as a wall, forming the course of the water-channel, and cause the water to take a circuitous course around the fire-spaces. Plugs *m* are provided to close openings into the water-passages. The water-back is made smaller than the frame or casing *f*, so that a space *e'* for flame and products of combustion is formed all around between them for better distributing the heat. The burners are also supported in the frame *f*, and are placed beneath the water-back, so that the flame and hot products pass around the water-back in space *e'* and through the apertures *e* made therein, thereby allowing the heated products to be utilized to heat an oven placed above and cooking utensils placed on the top of the stove. The frame *f* serves not only to support the burners and water-back, but also serves to confine a large amount of heat around the water-back and acts as a flue, drawing in all the heated products and necessary air for combustion. This is of great importance, as the heat will be fully utilized and cause water to be much more quickly heated, thus increasing the capacity of the water-back. The water from the circulating-boiler G passes through the pipe *h* and thence to the water-back, where it flows through the coils formed therein and returns to the boiler through the pipe *i i'*, the part *i'*, which extends over the water-back, thus receiving additional heat, and thence to the part *i* outside the stove to the boiler, the course of the water being indicated on the drawings by means of arrows. The water-back serves not only to heat the water passing through it, but serves when placed under the oven to protect the bottom of same from becoming too hot, and divides and deflects the heat, distributing it equally, thus insuring an equal temperature on all sides.

Figs. 3, 4, and 5 show modified forms of water-back, which may be used with equal facility as the one illustrated in Figs. 1 and 2. The course of the water is indicated by arrows, and the heated products pass through the apertures in and around the cast water-back, as in the former one.

In Fig. 7 is shown the top of the oven C, which I provide with partition-plates *j*, which are set on their edges and converge toward each other, but not meeting, and extend nearly across the top of the oven. These vertical strips serve as walls to retard the escape of heated air and products from around the oven, and, as shown by the arrows, give such products a circuitous passage, thus heating equally all portions of the top of the oven.

In Fig. 6 the stove is shown with the burner and water-back arranged as above described and with the oven C placed at the side and with its bottom on a level with the top of the stove proper. The heat from the burner and water-back is first supplied to the top of the stove and then passes to the elevated oven, where it is distributed on all sides of the same. This oven may be made detachable. Immediately beneath the burner is placed a perforated plate or shield *k*, which prevents too great a supply of air to the flame, the size of holes employed regulating the draft. The stoves in which the broiler and oven are placed one above the other, the burner, and water-back will suffice to heat both compartments by deflecting and reflecting the heated products.

According to construction as shown in Fig. 9, the water-back, burners, and frame are placed about the central portion of the stove, between the baking-oven C, placed above, and the roasting and broiling oven D, placed below, so that the water-back will reflect and deflect the heat for roasting and broiling purposes, and the heated products will heat the water-back and the oven above as they pass to the escape-flue. The baking-oven C (shown in Fig. 9) might be left off and the top for cooking utensils placed directly over the water-back, if desired. This arrangement is advantageous and gives good results in some stoves. In practice, however, the broiler is more frequently used than the baking-oven; and there has been much complaint on account of the broiler being placed so close to the floor as it is in the usual construction of gas-stoves, and to remedy this difficulty I arrange the broiling-oven D at the top of the stove, as shown in Fig. 8, and provide perforated bar burners above it. These burners serve for broiling and for heating two or more openings for cooking utensils in the top plate of the stove. The baking-oven C is placed in the bottom of the stove, and below this I place the water-back E, burners *d*, and perforated plate *k*, all supported in the frame *f*, as before described.

I am aware that water-backs in gas-stoves are not broadly new, and I make no broad claim thereto.

My claims in this application are confined to the peculiar construction of my improved water-back and to its arrangement in the stove in connection with a supporting-frame, the burners, &c.

Having thus particularly described and ascertained the nature of my said invention and in what manner the same is to be performed, I declare that what I claim is—

1. In a gas or fluid stove, the combination, with the walls of the stove, of burners and a casing inclosing the same and separated from the walls of the stove by an air-space, substantially as described.

2. In a gas or fluid stove, the combination, with the walls of the stove and burners and a water-back situated above the same, of a casing inclosing the burners and the water-back and separated from the walls of the stove by an air-space, substantially as and for the purpose set forth.

3. In a gas or fluid stove, the combination, with the walls of the stove and burners and a water-back situated above the same, of a casing inclosing the burners and water-back and separated from the walls of the stove by an air-space, and an oven located above the water-back, substantially as described.

4. In a gas or fluid stove, the combination, with the walls of the stove, burners, and a water-back above the same, of a casing inclosing the burners and water-back and separated both from the water-back and the walls of the stove by an air-space, substantially as set forth.

5. In a gas or fluid burning stove, the combination of the water-back made as described and imposed between the oven and burners, with the burners, pipe $i\ i'$, the part $i'$ of which extends over the water-back, pipe $h$, and boiler G, as and for the purposes set forth.

In testimony whereof I affix my signature in presence of two witnesses.

WILLIAM COMSTOCK BUCKLIN.

Witnesses:
H. H. MANSFIELD,
C. G. DEGOTT.